United States Patent
García Guirado

(10) Patent No.: US 10,891,235 B2
(45) Date of Patent: Jan. 12, 2021

(54) CACHE LINE STATUSES

(71) Applicant: Arm Limited, Cambridge (GB)

(72) Inventor: Antonio García Guirado, Trondheim (NO)

(73) Assignee: Arm Limited, Cambridge (GB)

(*) Notice: Subject to any disclaimer, the term of this patent is extended or adjusted under 35 U.S.C. 154(b) by 83 days.

(21) Appl. No.: 16/129,571

(22) Filed: Sep. 12, 2018

(65) Prior Publication Data

US 2019/0079874 A1 Mar. 14, 2019

(30) Foreign Application Priority Data

Sep. 13, 2017 (GB) .................................. 1714757.0

(51) Int. Cl.
| | | |
|---|---|---|
| *G06F 3/06* | (2006.01) | |
| *G06F 12/02* | (2006.01) | |
| *G06F 12/0831* | (2016.01) | |
| *G06F 12/128* | (2016.01) | |
| *G06F 12/0808* | (2016.01) | |

(Continued)

(52) U.S. Cl.
CPC ...... *G06F 12/0895* (2013.01); *G06F 12/0864* (2013.01); *G06F 12/0891* (2013.01); *G06F 12/0897* (2013.01); *G06F 12/128* (2013.01); *G06F 2212/1044* (2013.01)

(58) Field of Classification Search
CPC ............. G06F 12/0895; G06F 12/0864; G06F 12/0891; G06F 12/0897; G06F 12/128; G06F 2212/1044; G06F 12/084; G06F 12/0817; G06F 12/125; G06F 12/0848; G06F 12/0815

See application file for complete search history.

(56) References Cited

U.S. PATENT DOCUMENTS

| | | |
|---|---|---|
| 5,325,504 A | 6/1994 | Tipley et al. |
| 6,092,159 A | 7/2000 | Ekner et al. |

(Continued)

FOREIGN PATENT DOCUMENTS

| | | |
|---|---|---|
| GB | 2546245 A | 7/2017 |
| JP | 2003316648 A | 11/2003 |
| WO | 9932980 A1 | 7/1999 |

OTHER PUBLICATIONS

Combined Search and Examination Report dated Feb. 26, 2018 for Application No. GB1714757.0.

(Continued)

*Primary Examiner* — Charles Rones
*Assistant Examiner* — Tong B. Vo
(74) *Attorney, Agent, or Firm* — EIP US LLP

(57) ABSTRACT

A method can include allowing re-use of a selected shareable tag storage location and thus updating a first shareable tag portion comprised therein to a second shareable tag portion; identifying one or more cache lines associated with individual tag portions comprising a pointer to the selected shareable tag storage location; and setting a given cache line status for each of the identified cache lines, wherein the given cache line status: a) allows a cache line to continue to be used in relation to a storage access instruction received before said given cache line status was set; and b) inhibits the cache line from being used in relation to a storage access instruction received after the given cache line status is set.

16 Claims, 3 Drawing Sheets

(51) Int. Cl.
    *G06F 12/0895*     (2016.01)
    *G06F 12/0897*     (2016.01)
    *G06F 12/0891*     (2016.01)
    *G06F 12/0864*     (2016.01)

(56) References Cited

U.S. PATENT DOCUMENTS

| | | | |
|---|---|---|---|
| 6,122,709 A * | 9/2000 | Wicki | G06F 12/1054 |
| | | | 711/118 |
| 6,405,287 B1 | 6/2002 | Lesartre | |
| 2006/0294325 A1 | 12/2006 | Akiyama et al. | |
| 2007/0013704 A1 | 1/2007 | MacWilliams et al. | |
| 2009/0037666 A1* | 2/2009 | Rahman | G06F 12/0891 |
| | | | 711/143 |
| 2010/0088457 A1* | 4/2010 | Goodrich | G06F 12/0895 |
| | | | 711/3 |
| 2013/0007358 A1* | 1/2013 | Hu | G06F 12/0802 |
| | | | 711/108 |
| 2015/0012719 A1* | 1/2015 | Tune | G06F 12/0895 |
| | | | 711/171 |
| 2015/0278096 A1 | 10/2015 | Rolan et al. | |

OTHER PUBLICATIONS

Combined Search and Examination Report dated Feb. 27, 2018 for Application No. GB1714758.8.

\* cited by examiner

CACHE LINE STATUSES

CROSS REFERENCE TO RELATED APPLICATIONS

This application claims the benefit under 35 U.S.C. § 119(a) and 37 CFR § 1.55 to United Kingdom patent application no. GB1714757.0, filed on Sep. 13, 2017, the entire content of which is incorporated herein by reference.

BACKGROUND OF THE INVENTION

Technical Field

The present disclosure relates to cache storage and methods of controlling cache storage in data processing systems.

Description of the Related Technology

Data processing systems with cache storage are known. Cache storage can provide faster and more efficient access to frequently used data stored therein, compared to accessing the same data stored in a main storage of the data processing system.

Cache storage typically has limited size compared to the main storage and accordingly only a subset of the data held within the main storage are also stored within the cache storage at any given time.

It is desirable to provide cache storage that makes more efficient usage of its available storage space.

SUMMARY

In a first embodiment, there is provided a method of controlling cache storage comprising cache lines configured to store data entries representing data which can be retrieved from the cache storage when a storage access instruction contains a storage identifier which corresponds with a tag associated with a cache line. A said tag associated with a said cache line comprises an individual tag portion associated with the single said cache line, and a shareable tag portion which may be associated with a plurality of cache lines, said individual tag portion comprising a pointer to a shareable tag storage location comprising the shareable tag portion.

The method comprises: allowing re-use of a selected shareable tag storage location and thus updating a first shareable tag portion comprised therein to a second shareable tag portion; identifying one or more cache lines associated with individual tag portions comprising a pointer to the selected shareable tag storage location; and setting a given cache line status for each of the identified cache lines, wherein the given cache line status:

a) allows a cache line to continue to be used in relation to a storage access instruction received before said given cache line status was set; and b) inhibits the cache line from being used in relation to a storage access instruction received after the given cache line status is set.

In some examples, the method comprises setting an earlier cache line status before setting said given status, which earlier cache line status prevents said selected shareable tag storage location being re-used. The method may comprise setting said earlier cache line status for a cache line before sending a storage access instruction to data storage to retrieve data for storing as part of said cache line.

In some examples, the method comprises setting an intermediate cache line status for a cache line before setting said given status and after sending a storage access instruction to data storage to retrieve data for storing as part of said cache line. The intermediate cache line status allows said selected shareable tag storage location to be re-used. The intermediate cache line status may be a first intermediate cache line status, and the method may comprise setting a second intermediate cache line status for said cache line after storing data in the cache storage as part of said cache line based on said storage access instruction to said data storage. The second intermediate cache line status allows said selected shareable tag storage location to be re-used.

In some examples, said given cache line status comprises one of a first given cache line status and a second given cache line status. The method may comprise:

setting said first given cache line status for each of the identified cache lines for which a corresponding storage access instruction has been sent to data storage to retrieve respective data for storing as part of each respective cache line; and setting said second given cache line status for each of the identified cache lines for which respective data is stored in the cache storage as part of each respective cache line.

In some examples, the method comprises setting a later cache line status after said given status, which later cache line status allows the cache line to be re-used. The method may comprise: determining a respective number of instructions dependent on each of the identified cache lines having said given cache line status; and setting said later cache line status for each of the identified cache lines for which the respective number of dependent instructions is zero.

In some examples, the method comprises, when allowing a cache line to continue to be used in relation to a storage access instruction which was received before said given cache line status was set, and before said selected shareable tag storage location is re-used: locking said cache line; obtaining an index of the cache line in the cache storage; and storing the index and an identifier of the storage access instruction as an entry in a buffer.

The method may further comprise: relaying the storage access instruction to data storage to retrieve data for storing as part of the cache line in the cache storage; receiving said data at the cache storage; identifying the entry in the buffer corresponding to the identifier of the storage access instruction; obtaining the index of the cache line in the cache storage from the entry in the buffer; accessing the cache line in the cache storage based on said index; and storing said data as part of the cache line.

In some examples, the method comprises, before re-using the selected shareable tag storage location: receiving a request for data not stored in the cache storage; allocating a cache line to store said data in the cache storage; sending a storage access instruction to data storage to retrieve the data for storing as part of said cache line; and associating an identifier of the storage access instruction with an index of the said cache line in the cache storage.

In some examples the method comprises, after the data associated with the storage access instruction submitted to the data storage is received at the cache storage: obtaining the index of said cache line based on the identifier of the storage access instruction; and storing a data entry representing the data as part of the said cache line in the cache storage.

In some examples, the method comprises: receiving a storage access instruction corresponding to data represented by a data entry stored in one of the identified cache lines; and signalling a cache miss based on said cache line having the given cache line status.

In some examples, the method comprises, for each cache line of the cache storage, storing in a data structure: a first data value representing whether or not a respective cache line is associated with the selected shareable tag storage location; and a second data value representing whether or not the respective cache line is associated with a pending storage access instruction.

In some examples, the method comprises determining a number of cache lines of the cache storage that are associated with the selected shareable tag storage location.

In some examples, the method comprises: receiving a flush instruction to clear the data stored in the cache storage; setting the given cache line status for each cache line of the cache storage; determining a number of instructions dependent on each cache line; and in response to determining that the number of instructions dependent on each cache line is zero for a subset of cache lines in the cache storage, clearing data being stored as part of each cache line in the subset of cache lines.

In a second embodiment, there is provided a cache storage comprising cache lines to store data entries representing data which can be retrieved from the cache storage when a storage access instruction contains a storage identifier which corresponds with a tag associated with a cache line, wherein a said tag associated with a said cache line comprises an individual tag portion associated with the single said cache line, and a shareable tag portion which may be associated with a plurality of cache lines, said individual tag portion comprising a pointer to a shareable tag storage location comprising the shareable tag portion, the cache storage configured to:

allow re-use of a selected shareable tag storage location and thus update a first shareable tag portion comprised therein to a second shareable tag portion;

identify one or more cache lines associated with individual tag portions comprising a pointer to the selected shareable tag storage location; and set a given cache line status for each of the identified cache lines, wherein the given cache line status:
 a) allows a cache line to continue to be used in relation to a storage access instruction received before said given cache line status was set; and
 b) inhibits the cache line from being used in relation to a storage access instruction received after the given cache line status is set.

In a third embodiment, there is provided a data processing system comprising a processor configured to output storage access instructions, and cache storage comprising cache lines to store data entries representing data which can be retrieved from the cache storage when a storage access instruction contains a storage identifier which corresponds with a tag associated with a cache line, wherein a said tag associated with a said cache line comprises an individual tag portion associated with the single said cache line, and a shareable tag portion which may be associated with a plurality of cache lines, said individual tag portion comprising a pointer to a shareable tag storage location comprising the shareable tag portion, the cache storage comprising cache control circuitry configured to:

allow re-use of a selected shareable tag storage location and thus update a first shareable tag portion comprised therein to a second shareable tag portion;

identify one or more cache lines associated with individual tag portions comprising a pointer to the selected shareable tag storage location; and set a given cache line status for each of the identified cache lines, wherein the given cache line status:
 a) allows a cache line to continue to be used in relation to a storage access instruction received before said given cache line status was set; and
 b) inhibits the cache line from being used in relation to a storage access instruction received after the given cache line status is set.

DETAILED DESCRIPTION OF CERTAIN INVENTIVE EMBODIMENTS

In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
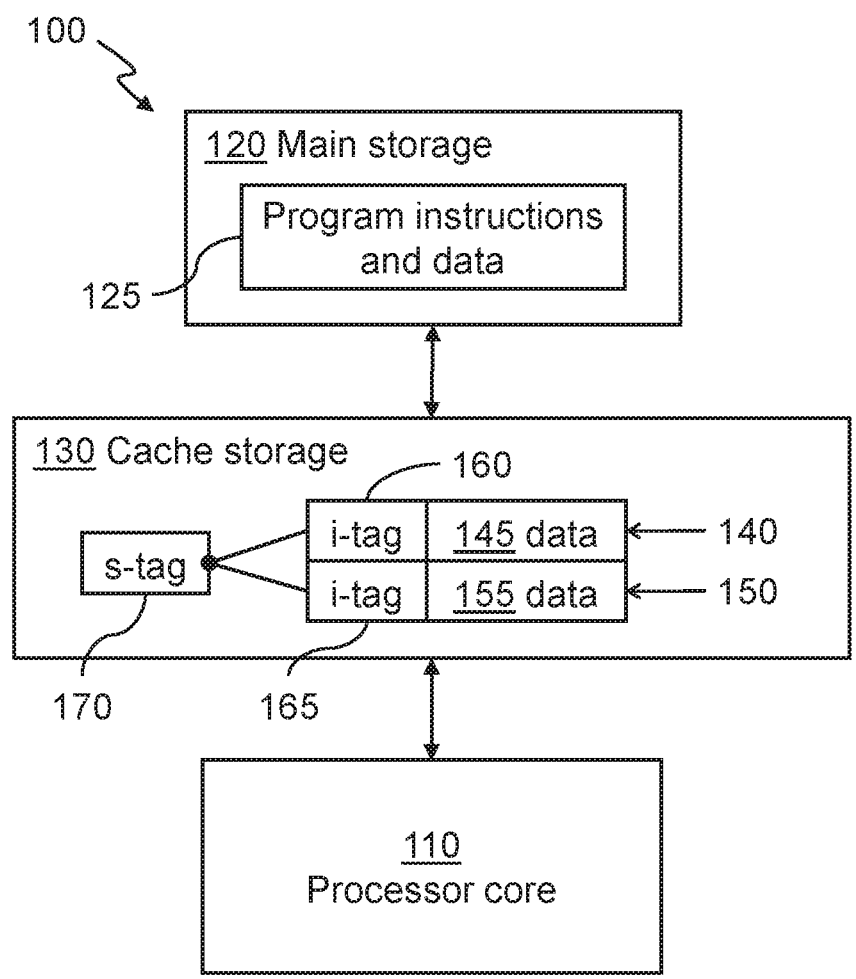
FIG. 1 shows a schematic representation of a data processing system including main storage and cache storage, according to examples.

FIG. 1 schematically illustrates a data processing apparatus 100 comprising a processor 110, main storage 120, and cache storage 130. The cache storage 130 is disposed between the processor 110 and main storage 120 and may serve to store, or cache, a subset of data 125 stored in the main storage 120. The processor 110 may be a processor core capable of reading and executing program instructions. Compared to the main storage 120, the cache storage 130 may be a smaller, faster storage and may provide quicker and/or more efficient access, for example using less energy, to any given data cached in the cache storage 130 compared to accessing the given data from the main storage 120.

The cache storage 130 may be an instruction cache configured to store executable instructions fetched from main storage 120, a data cache to store data fetched from main storage 120, a cache able to do both of these functions, or a translation lookaside buffer (TLB) as part of a storage management unit (MMU). The term "data" is used herein to generally include any type of data that the particular cache storage 130 is configured to store, for example executable instructions for an instruction cache, or virtual-to-physical address translations for a TLB. The cache storage 130 may be 'read only'.

In some examples, the cache storage 130 may be a texture cache for a graphics processing system, e.g. used as part of a graphics pipeline. In such examples, the cache storage may be configured to store texture data, e.g. representative of one or more texture elements or "texels" in a texture space.

The cache storage 130 is divided into multiple blocks, termed "cache lines" or "cache blocks" 140, 150. The cache lines 140, 150 may be indexed in the cache storage 130, and comprise storage space for storing data 145, 155 transferred or copied from the main storage 120.

In known cache storage systems, each cache line 140, 150 is associated with a tag for corresponding to, e.g. at least partly matching, a storage identifier (for example a storage address) representing a location in data storage (e.g. the main storage 120) to that particular cache line. The tags may be stored with, or comprised as part of, the cache lines 140, 150, or may be stored separately to the cache lines, for example in tag storage which may be comprised in the cache storage 130 or in a physically separate and discrete storage.

In alternative nomenclature, data transferred between the main storage 120 and the cache storage 130 (e.g. in a block of fixed size) may be called a cache line or cache block, and the cache storage 130 may store "cache entries", where each cache entry includes the copied data (cache line) and a tag.

The processor 110, before reading or writing a location in the main storage 120, for example as part of a storage access instruction (such as a memory access request) may first check the cache storage 130 for the contents (i.e. data) corresponding to the main storage location.

A "cache hit" may occur if the data is found in the cache storage 120, and a "cache miss" may occur if it is not. In the case of a cache hit, the data may be read directly from the cache storage 130.

In the case of a cache miss, the data may be read from the main storage 120 at a cost to speed and efficiency, and may also be stored in the cache storage 130 for subsequent quicker access. The cache storage 130 can be provided with a replacement policy to determine which cache line 140, 150 (which may already contain data 145, 155) should be removed from the cache storage 130 in order to make space for new data to be fetched from the main storage and stored within the cache storage 130. There are many known examples of cache replacement policies, such as least recently used, round robin and (pseudo-) random search.

The cache storage 130 may comprise a cache controller, for example cache control circuitry. The cache controller may receive storage access instructions from the processor 110, and may process these instructions to search the cache storage 130 for data. The cache controller may also retrieve stored data in the case of a cache hit, and transfer said data to the processor 110. In the case of a cache miss, the cache controller may submit a further storage access instruction, e.g. relay the storage access instruction received from the processor 110, to the main storage 120 to retrieve said data and transfer it to the processor 110. In alternative examples, the cache controller may be external to, and coupled to, the cache storage 130.

As described, a tag of the cache storage 130 may be used to map a storage location of the main storage 120 to a cache line where the data stored at said storage location of the main storage 120 has been (or is to be) copied and stored in the cache storage 130.

For example, the main storage 120 may comprise storage locations, each represented by m-bit storage identifiers. The least significant k bits of said storage identifier (for example a storage address) may correspond to an index of the cache storage 130, where each index corresponds to a particular cache line. The remaining (m-k) bits of the address may correspond to a tag. Therefore, a concatenation of the index and the tag for a given cache line may correspond to a particular storage identifier representing a storage location in the main storage 120.

When checking the cache storage 130 for given data, e.g. as part of a storage access instruction, the least significant k bits of the storage identifier may be mapped to an index of the cache storage 130. The remaining (m-k) bits of the identifier may be compared to the tag of the cache line at the mapped index of the cache storage 130. If the tag matches, and the cache line is valid (i.e. comprises stored data, which may be indicated by a flag value) then the given data may be read from the cache storage 130.

Such tags as described hitherto in the context of known systems, wherein each cache line is associated with a respective tag, may be referred to herein as "flat tags". As described, in known cache storage 130 and methods for operating them, a flat tag can be used to map part of a storage identifier, which as a whole represents a storage location e.g. in main storage 120, to a cache line associated with the flat tag. The remaining, least significant, part of the storage identifier may be provided by the index of the cache line.

In examples described herein, and in contrast to flat tags, a tag may be stored in the form of an individual tag portion 160, 165 which is individual to each cache line 140, 150 of cache storage 130, and a shareable tag portion 170 which is shareable between two or more cache lines, with pointer data associating the individual tag portions with the shareable tag portion.

Each cache line 140, 150 may be mapped to a different storage location external to the cache storage 130 (e.g. in main storage 120). The shareable tag portion 170 may comprise a part of two or more storage identifiers that is common for two or more corresponding cache line tags. The individual tag portions 160, 165 may comprise respective remaining parts of the storage identifiers that are not common for said two or more cache lines 140, 150.

Pointer data associates the individual tag portions with the shareable tag portion to make a tag, i.e. corresponding to what would be the flat tag in the described known systems, for each cache line in the cache storage 130. Each individual tag portion 160, 165 may comprise a pointer, e.g. pointer data, to a shareable tag storage location comprising the shareable tag portion 170. For example, the shareable tag storage location may be one of a plurality of shareable tag storage locations comprised within shareable tag storage. Each shareable tag storage location may have an individual index and storage area for per shareable tag portion. Therefore, the pointer of a given individual tag portion 160, 165 may associate said individual tag portion 160, 165 with a specific shareable tag portion 170 by corresponding to, or matching, the index of said shareable tag portion in the shareable tag storage. The shareable tag storage may be comprised in the cache storage 130, or may be external to the cache storage. For example, the shareable tag storage may be stored in a separate and distinct storage to the individual tag portions 160, 165 and/or associated cache lines 140, 150, or in another cache level of a multi-level cache storage.

In this way, the separate shareable and individual tag portions 160, 165, 170 can be combined to form tags that are each able to function in the same way as a flat tag, for example when checking the cache storage 130 for given data, as part of a storage access instruction. Each shareable tag portion 170 may be stored in one location, i.e. a given shareable tag storage location, and thus storage area may be saved compared to storing the shareable tag portion 170 as part of a flat tag in each cache line of the cache storage, as in known cache storage systems.

However, storing shareable and individual tag portions separately may mean that new storage access instructions, i.e. ones that follow a previous storage access instruction causing data to be copied from data storage and stored in the cache storage, might misidentify a cache line as being a cache hit based on the associated tag matching the storage identifier contained in the new instruction. For example, the shareable tag portion, stored in a shareable tag storage location, may be updated by a different process.

For example, a cache line which has been cleared of its stored data, or "invalidated", and is thus over-writable, would otherwise result in the shareable tag portion associated with the cache line also being "invalidated" (and thus also over-writeable). However, an individual tag portion associated with another, non-invalidated, cache line may still point to the same shareable tag location comprising the shareable tag portion, which would now be "wrong" for that cache line. So an incorrect cache hit may occur following a storage access request, and the wrong data may be supplied e.g. to the processor that submitted the storage access request. A cache miss should instead occur in this situation, and the data requested in the storage access instruction should be fetched from data storage, e.g. main storage, instead. The newly fetched data could then be stored in a different cache line, which can be associated with the correct shareable tag portion by the associated individual tag portion pointing to the shareable tag storage location comprising the correct shareable tag portion (which may be the shareable tag storage location that was being pointed at before by the "wrong" cache line).

One option for addressing this issue may be to not allow shareable tag locations to be re-used, i.e. not allow the shareable tag portions stored therein to be updated, until all cache lines pointing to them are clear in the invalid state. However, this may be inefficient as cache lines may be locked, i.e. prevented from being invalidated, by instructions, and so the shareable tag storage location may effectively also be locked, i.e. prevented from being re-used.

Another option may be to invalidate all cache lines that are pointing to a shareable tag storage location whenever one of the cache lines pointing to it is invalidated. However this may also be inefficient, and may make using shareable tag portions less efficient than using the known complete tag per cache line system.

The examples described herein involve identifying a point at which a shareable tag location may be "released" for re-use, even though a cache line pointing to the shareable tag location may remain in use by an instruction (e.g. it is locked for use by other instructions, or it is waiting for data from main storage after the cache line has been allocated to store said data). The present examples allow a shareable tag storage location to be re-used, but may selectively prevent instructions from accessing the shareable tag storage location after re-use. For example, new instructions may not be allowed to access the re-used shareable tag storage location when trying to access any individual tag portion (and associated cache line) that pointed to the shareable tag storage location before it was re-used. New instructions may access the re-used shareable tag storage location if they address cache lines that have been allocated after the shareable tag storage location was re-used. Therefore, the present examples may reduce the likelihood of erroneous cache hits. In some cases, erroneous cache hits are prevented altogether.

Figure 2:
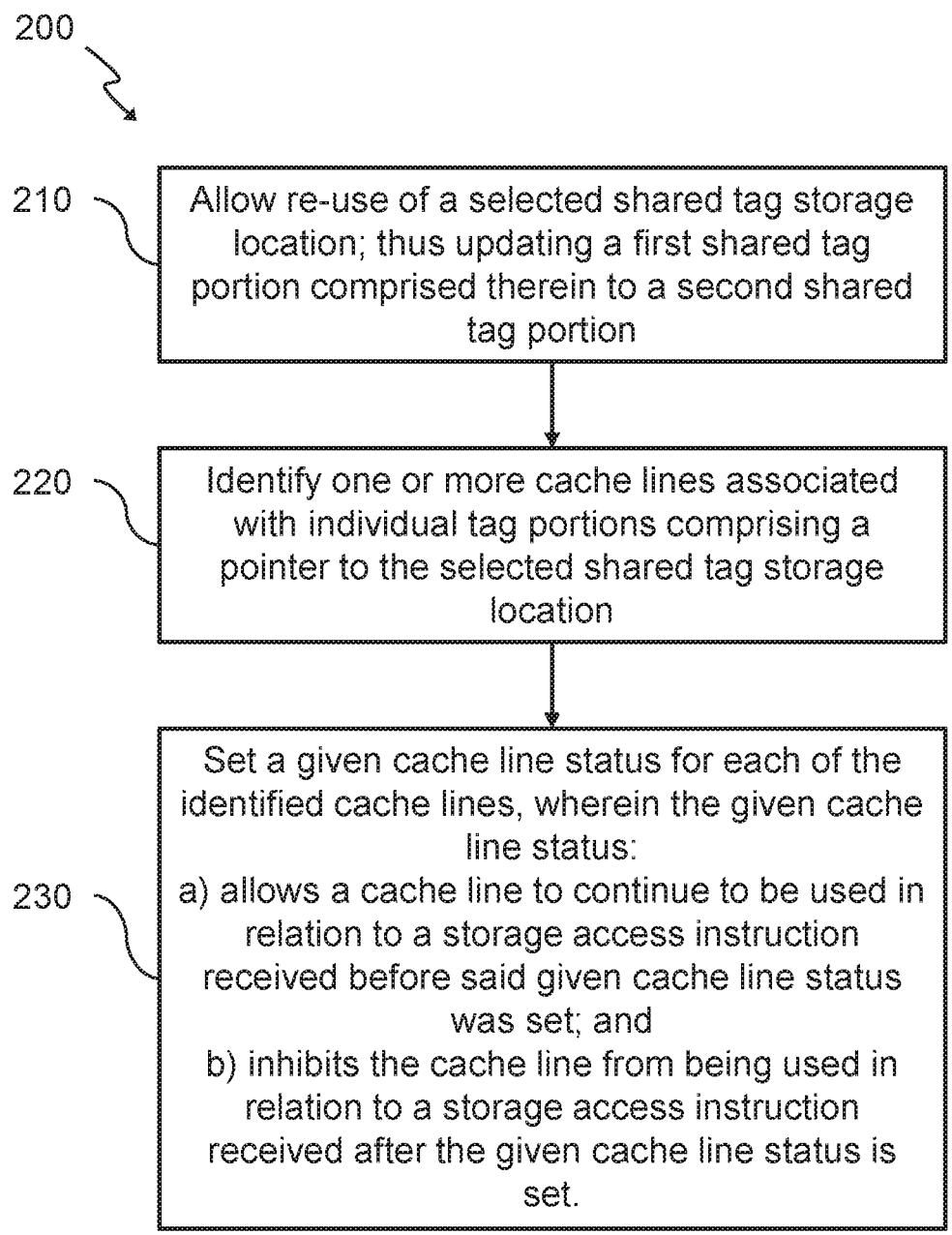
FIG. 2 shows a flow diagram illustrating a method of controlling cache storage according to examples.

FIG. 2 shows a flow diagram illustrating a method 200 of controlling cache storage comprising cache lines. As described, such cache lines are configured to store data entries representing data which can be retrieved from the cache storage when a storage access instruction contains a storage identifier which corresponds with a tag associated with a cache line.

As described herein, a said tag associated with a said cache line comprises an individual tag portion associated with the single said cache line, and a shareable tag portion which may be associated with a plurality of cache lines.

A given individual tag portion may be stored with, or comprised as part of, the associated cache line, or may be stored separately to said cache line, for example in tag storage, or tag memory, which may be comprised in the cache storage or in a physically separate and discrete storage. In any case, each individual tag portion may be considered to functionally be a part of a corresponding cache line.

The individual tag portion comprises a pointer to a shareable tag storage location comprising the shareable tag portion, as described above.

The method 200 involves, at block 210, allowing re-use of a selected shareable tag storage location and thus updating a first shareable tag portion comprised therein to a second shareable tag portion. Allowing re-use of the selected shareable tag storage location may comprise re-using storage space at the selected shareable tag storage location, for example updating the first shareable tag portion comprised therein to the second shareable tag portion, which the second shareable tag portion functioning as described. Alternatively, allowing re-use of the selected shareable tag storage location may comprise freeing it up for re-use, for example effectively marking the shareable tag storage location as available to store a new (e.g. the second) shareable tag portion.

The method further involves, at block 220, identifying one or more cache lines associated with individual tag portions comprising a pointer to the selected shareable tag storage location. For example, the pointers of the individual tag portions can each be checked to determine whether they correspond to, or match, the selected shareable tag storage location. For those pointers that do correspond, the associated one or more cache lines are thus identified.

The method further involves, at block 230, setting a given cache line status for each of the identified cache lines. The given cache line status:

a) allows a cache line to continue to be used in relation to a storage access instruction received before said given cache line status was set; and b) inhibits the cache line from being used in relation to a storage access instruction received after the given cache line status is set.

Inhibiting the identified cache line(s) from being used by "new" storage access instructions, i.e. received after the given cache line status is set, may reduce the likelihood of erroneous cache hits resulting from such storage access instructions trying to access data stored in these lines. In certain cases, such erroneous cache hits are prevented. Any new instructions trying to access the data of a cache line in the given state may allocate a new cache line, and possibly a new shareable tag storage location.

For example, the method 200 may further include receiving a storage access instruction corresponding to data represented by a data entry stored in one of the identified cache lines, and signalling a cache miss based on said cache line having the given cache line status.

A cache line status, or state of a given cache line, may be represented by status data comprised in the cache line, e.g. as part of the individual tag portion associated with the cache line. The status data may comprise data to signal what state the cache line is in. For example, in simple known cases where cache lines may be in a valid state when storing data, and in an invalid state when not storing data, the status data may comprise a bit having two possible values; one for each of the valid and invalid states. In examples described herein, wherein the cache lines may be in one of a number of states, the status data may comprise a bit string having at least as many possible values as possible cache line states. Such status data may be called 'flags' in some nomenclatures.

In some examples, the method 200 may include setting an earlier cache line status before setting said given status. The earlier cache line status may prevent said selected shareable tag storage location being re-used. For example, the earlier cache line status may be set for a cache line that has been allocated, i.e. mapped to a storage location, but before a storage access instruction to data storage has been sent to retrieve data for storing in, or as part of, said cache line. The data storage could be one or more of: a different cache level comprised in the cache storage; another cache storage; main storage; and secondary storage.

When the cache line in this earlier cache line status, which may be termed an "allocated" state, the shareable tag portion associated with the cache line may be used to submit the storage access instruction to data storage. For example, the shareable tag portion may be combined, or concatenated, with the individual tag portion associated with the cache line to correspond with (at least part of) a storage identifier, for example a storage address, corresponding to a storage location in the data storage. The storage identifier can be included in the storage access instruction to the data storage. Preventing the selected shareable tag storage location being re-used may allow the storage access instruction to be sent to the data storage using the shareable tag portion currently stored in the selected shareable tag storage location, and so give a correct mapping between the cache line and the storage location in the data storage.

In certain cases, a given storage access instruction may be received at the cache storage, but none of the shareable tag storage locations may be re-usable such that a shareable tag portion cannot be allocated. In this case, the instruction flow may be stalled until a shareable tag storage location can be allocated, e.g. becomes re-usable. Alternatively, other storage access instructions in the instruction flow may be processed before retrying the given storage access instruction.

In some examples, the method 200 may include setting an intermediate cache line status for a cache line before setting said given status and after sending a storage access instruction to data storage to retrieve data for storing as part of said cache line. The intermediate cache line status may allow the selected shareable tag storage location to be re-used, as described earlier with reference to block 210 of the method 200 shown in FIG. 2.

For example, when in the intermediate cache line status, which may be termed a "requested" state, a given cache line may be waiting for data to be retrieved from data storage and stored as part of the given cache line. As the storage access instruction to the data storage has been submitted, the shareable tag portion associated with the given cache line may not be needed to submit another storage access instruction and so the shareable tag storage location wherein it is stored may be re-used. Re-using the shareable tag storage location may "trigger" the blocks 220, 230 of the method 200 shown in FIG. 2 i.e. where cache lines associated with individual tag portions that comprise a pointer to the selected shareable tag storage location are set the given cache line status.

In some examples, the intermediate cache line status is a first intermediate cache line status, and the method may comprise setting a second intermediate cache line status for a given cache line after storing data in the cache storage as part of the cache line. For example, the data may have been retrieved based on the storage access instruction to the data storage. Therefore, until the shareable tag storage location is re-used, a given cache line in the requested state may wait for data to be retrieved from data storage, and when said data is retrieved the given cache line may bet set to the second intermediate cache line status, which may be termed a "valid" state. When a cache line is in the valid state, the data stored as part of the cache line can be retrieved from the cache storage when a storage access instruction sent to the cache storage contains a storage identifier which corresponds with a tag associated with the cache line. The second intermediate cache line status (valid state) may also allow the shareable tag storage location, which the individual tag portion associated with the cache line in the valid state points to, to be re-used. As described with reference to the first intermediate cache line status, re-using the shareable tag storage location may "trigger" the blocks 220, 230 of the method 200 shown in FIG. 2.

In further examples, the given cache line status set for each identified cache line, at block 230 of the method 200 shown in FIG. 2, may comprise one of a first given cache line status and a second given cache line status. The method 200 may involve setting the first given cache line status for each of the identified cache lines for which a corresponding storage access instruction has been sent to data storage to retrieve respective data for storing as part of each respective cache line. The second given cache line status may be set for each of the identified cache lines for which respective data is stored in the cache storage as part of each respective cache line. For example, a delineation may be made between those identified cache lines that are waiting for data to be retrieved from the data storage for storing as part of said cache lines, and those identified cache lines that are storing data retrieved from the data storage. For example, the first given cache line status may be termed a "requested deferred invalid" state and the second given cache line status may be termed a "deferred invalid" state in parallel with the requested and valid states described above. A cache line may transition from the requested deferred invalid state to the deferred invalid state when the data requested from the data storage is retrieved and stored as part of the cache line.

In some cases, a cache line may transition from the valid state to the deferred invalid state in response to the shareable tag storage location associated with the cache line being re-used.

In some examples, the method 200 of FIG. 2 may include setting a later cache line status after said given status, the later cache line status allowing the cache line to be re-used. For example, the later cache line status may termed an "invalid" state, signalling that a given cache line having the later cache line status is empty or clear of stored data and so available to store data corresponding to a storage location external to the cache storage. In some nomenclatures, transitioning a cache line to the invalid state and clearing its stored data may be termed "evicting" the cache line, such that a cache line in the invalid state is said to have been "evicted".

In further examples, the method 200 of FIG. 2 may include determining a respective number of instructions dependent on each of the identified cache lines having said given cache line status. The instructions may be operations performable by a processor coupled to the cache storage, the operations being dependent on data stored in data storage e.g. main storage. As described, such data stored in the data storage may also be stored in the cache storage. Thus, the method may involve determining how many such instructions or operations are dependent on the identified cache lines (i.e. those cache lines associated with individual tag portions comprising a pointer to a selected shareable tag storage location that has been re-used) that have the given cache line status, for example are in the requested deferred invalid state and/or deferred invalid state.

In examples, each cache line of the cache storage has a usage indicator associated with it which stores the respective number of instructions dependent on the respective cache line. The usage indicator may be termed a "reference counter". For example, the reference counter for a given cache line may be incremented when the given cache line is queried, and may be decremented when the data stored in the given cache line has been read out. Using usage indicators, or reference counters, in this way may be used to identify which cache lines are in use at any one time, e.g. whose respective reference counters are non-zero. Such cache lines may therefore be locked to prevent any change to those lines; described further below.

Usage indicators may also allow "inactive" cache lines, e.g. those whose reference counter is equal to zero, to be evicted for allocating to a storage location for a new request. For example, the method 200 may include setting the later cache line status (invalid state) for each of the identified cache lines for which the respective number of dependent instructions (reference counter) is zero. As previously described, an inactive cache line to be evicted (set to the invalid state) can be chosen in a number of ways, for example using a (pseudo-) random search, or a sequential search through the list of cache lines, or by keeping track of and identifying the least recently used inactive cache line.

In some examples, the method 200 of FIG. 2 involves, when allowing a cache line to continue to be used in relation to a storage access instruction which was received before said given cache line status was set, and before said selected shareable tag storage location is re-used, locking said cache line. Locking a given cache line may be implemented by a locking instruction, which may update a status of the cache line to locked (e.g. the cache line may be in the valid state and locked). When locked, the cache line may not be evicted so that data which is stored by the cache line stays available, in the cache storage, to the processor.

The tags stored in the cache storage (in the form of individual and shareable tag portions associated by pointers) may be used to determine storage identifiers (e.g. memory addresses) representing storage locations comprising data to be stored in the cache lines. Such determination of storage identifiers may be done asynchronously. For example, an instruction might allocate more than one cache line at once. In examples, a background process scans for allocated cache lines and issues the corresponding storage access instructions (e.g. memory requests) one at a time. Such requests may typically be issued quickly.

If a given shareable tag storage location, which is pointed to by an individual tag portion associated with a given locked cache line, is re-used, the given locked cache line (and any other locked cache lines with individual tag portions pointing to the given shareable tag storage location) may be mapped to a different storage location and thus be vulnerable to erroneous cache hits.

The method 200 may therefore involve, further to locking a given cache line being used in relation to a storage access instruction received before the given cache line status is set, and before the selected shareable tag storage location is re-used, obtaining an index of the cache line in the cache storage, and storing the index and an identifier of the storage access instruction as an entry in a buffer. The index of the cache line may be termed its "line ID" and may be equivalent to the line number of the cache storage it occupies. The buffer may be a temporary storage, comprised in the cache storage, for storing data entries linking a given storage access instruction to a given cache line.

Storage access instructions represented in the buffer, e.g. by individual identifiers, may no longer need to access shareable tag storage locations associated with given cache lines to relay the storage access instructions to data storage. Instead, the line IDs stored in the buffer alongside the storage access instructions can map the storage access instructions to respective cache lines in the cache storage.

In some examples, the method 200 may involve relaying the storage access instruction to data storage to retrieve data for storing as part of a given cache line in the cache storage and subsequently receiving the data at the cache storage. The method 200 may then include identifying the entry in the buffer corresponding to the identifier of the storage access instruction. For example, the storage access instruction may be looked up in the buffer (e.g. based on a matching storage identifier) and a linked index of the appropriate given cache line may be read from a matching entry. The index of the cache line (in the cache storage) may be obtained from the entry in the buffer and the corresponding cache line in the cache storage may be accessed based on said index to store the data.

In further examples, the method 200 of FIG. 2 may include, before re-using the selected shareable tag storage location, receiving a request for data not stored in the cache storage. For example, the request for data may be part of a storage access instruction sent by the processor. If the data is not stored in the cache storage, a cache miss may occur, as described. Therefore, the method 200 may include allocating a cache line to store the requested data in the cache storage, and sending a storage access instruction to data storage (e.g. main storage) to retrieve the data for storing as part of the allocated cache line. When the cache line is allocated, its status may be updated to the earlier cache line status, or allocated state, as described in examples. The method 200 may further include associating an identifier of the storage access instruction (sent to the data storage) with an index of the said cache line in the cache storage, e.g. the line ID of the cache line. The identifier of the storage access instruction may comprise data that has a value individually corresponding to the storage access instruction, and may be termed a "request ID".

The method 200 may then include, after the data associated with the storage access instruction submitted to the data storage is received at the cache storage, obtaining the index of the allocated cache line based on the identifier of the storage access instruction. A data entry representing the data may then be stored as part of the allocated cache line in the cache storage. Thus, when a storage access instruction (e.g. memory request) is submitted to data storage, the cache line indexes (line IDs) can be used with the storage access instruction identifiers (request IDs) to write data retrieved from data storage into the correct allocated cache line of the cache storage.

Once the one or more storage access instructions associated with a given cache line are issued and the line ID of the given cache line has been obtained, the shareable tag storage location may be re-used (e.g. updating the shareable tag portion comprised therein) even if the data has not yet been stored (loaded) in the given cache line, and there is a locking instruction keeping the cache line locked. Once the data is loaded in the cache line, instructions can read it from the cache storage by using the ID they obtained on lookup, even if the shareable tag storage location has since been reused and contains a new shareable tag portion.

In some examples, the method 200 of FIG. 2 may include, for each cache line of the cache storage, storing in a data structure: a first data value representing whether or not a respective cache line is associated with the selected shareable tag storage location; and a second data value representing whether or not the respective cache line is associated with a pending storage access instruction. For example, the data structure may comprise a data array, with a row in the array per cache line in the cache storage, and two columns of the array for the first and second data values for each cache line.

Storing these first and second data values in the data structure for each cache line can allow the cache storage, or another component of a data processing system comprising the cache storage, to keep track of which cache lines still need the contents of the shareable tag storage locations (i.e. the shareable tag portions comprised therein) to issue their storage access instructions (e.g. memory requests) to data storage (e.g. main storage). Cache lines associated with a pending storage access instruction may be in the allocated state, for example, and therefore may depend on the shareable tag storage location contents (i.e. the shareable tag portion currently stored therein). The data structure associated with a given shareable tag storage location may show if there are any cache lines depending on the shareable tag storage location, for example where the individual tag portion associated with a cache line comprises a pointer to the shareable tag storage location.

For each cache line, the first data value of the data structure may represent either a "true" or "false" logic state for whether or not the cache line is associated with the selected shareable tag storage location. For example, in a bitmap, these states may correspond with 1 and 0 values of a first bit, respectively. The second data value of the data structure may represent either a "true" or "false" logic states for whether or not the cache line is associated with a pending storage access instruction. Similarly, in a bitmap, these states may correspond with 1 and 0 values of a second bit, respectively.

The data structure (e.g. bitmap) may be "reduced" by a logic function to a single value that indicates whether or not there are cache lines that firstly point to the associated shareable tag storage location, and secondly are in the allocated state. The reducing logic function, which may be termed an "OR reduce" function, may run through each row of the data structure, associated with a given shareable tag storage location, to determine whether there any rows with first and second data values each representing "true" logic states, e.g. [1 1] in a bitmap. If there is at least one such row in the data structure, e.g. if an output of the reducing logic function is "true", this may indicate that there is a cache line in the cache storage that points to the given shareable tag storage location and is in the allocated state. The given shareable tag storage location may thus not be allowed to be re-used based on this indication, e.g. based on the output of the reducing logic function being "true".

In alternative examples, the method 200 may include determining a number of cache lines of the cache storage that are associated with the selected shareable tag storage location. For example, this may involve keeping an updated counter, per shareable tag storage location, to track the number of cache lines dependent on a given shareable tag storage location. The counter may be incremented when a new individual tag portion, associated with a cache line, points to the respective shareable tag storage location. The counter may be decremented when a cache line, associated with an individual tag portion pointing to the respective shareable tag storage location, transitions from the allocated state 310 to the requested state 320. This implementation may be efficient in cache storage where cache lines are allocated one by one.

In examples, the method 200 of FIG. 2 includes receiving a flush instruction to clear the data stored in the cache storage. The method 200 may include, following receiving the flush instruction, setting the given cache line status for each cache line of the cache storage. Thus, in the given cache line status, e.g. (requested) deferred invalid state, each cache line in the cache storage may continue to be used in relation to a storage access instruction received before said given cache line status was set, but may be inhibited from being used in relation to a storage access instruction received after the given cache line status is set. An effective memory barrier may therefore be created, as storage access instructions, e.g. memory requests, received at the cache memory after the flush instruction cannot access (cache hit on) data that was requested before the flush instruction.

In examples, cache lines in the allocated state remain in the allocated state after the flush instruction is received. These cache lines may not be flushed, e.g. cleared or emptied, based on the flush instruction. Since storage access instructions, e.g. memory requests, for these cache lines have not been issued to data storage, e.g. main storage, when in the allocated state, the data they will eventually receive from data storage corresponds to data from after the memory barrier (i.e. the flush instruction). Therefore, this data may be valid for any subsequent storage access instructions received after the memory barrier. Data already stored in the cache storage, e.g. in cache lines that are in the valid state, before the memory barrier may be flushed. Similarly, data which had been requested prior to the memory barrier, e.g. by cache lines that are in the requested state, may also be flushed as old data from before the memory barrier could be received by such cache lines.

After setting the given cache line status for each cache line of the cache storage following the flush instruction, the method 200 may involve determining a number of instructions dependent on each cache line. As previously described, this may be done using a reference counter corresponding to each cache line. In response to determining that the number of instructions dependent on each cache line is zero for a subset of cache lines in the cache storage, the method 200 may include clearing data being stored as part of each cache line in the subset of cache lines. For example, when the flush instruction is received and the cache lines are updated to the given cache line status, e.g. updated to the (requested) deferred invalid state, some of the cache lines in the cache storage may have no pending instructions depending on them (i.e. the data that they are storing). This subset of cache lines may therefore be cleared based on the flush instruction, as any new instruction may not access the data stored in these cache lines. For the remaining cache lines in the cache storage, the data stored therein may be cleared when the number of instructions depending thereon reaches zero.

For example, a given cache line may have a reference count of 2, i.e. two instructions dependent on the cache line, when the flush instruction is received. If the data is already loaded into the given cache line when the flush instruction is received, i.e. the cache line is in the valid state, then its cache line status would be updated to the given cache line status (deferred invalid state). In the deferred invalid state, no new instruction made to the cache storage may access the given cache line, but the two instructions dependent on the cache line, which were received at the cache storage prior to the flush instruction, may still access the given cache line and the data stored therein. Once the first of these instructions has read the data from the cache line, the number of dependent instructions (and so the reference counter) would be reduced to 1. Once the second of these instructions has read the data from the cache line, the number of dependent instructions (and so the reference counter) would be reduced to 0, and so the data stored in the cache line may be cleared as per the flush instruction. Because, in the deferred invalid state, new instructions may not access the given cache line, the number of dependent instructions should eventually reach zero allowing the data stored in the cache line to be cleared.

Overall, in response to a flush instruction, all cache lines may eventually transition to the invalid state 300, with those in the deferred invalid state 350 first reducing the number of dependent instructions to zero.

Thus, cache flushing can be efficient using these methods: flushing can occur over a single cache cycle, and has little impact on storage area and performance (since new cache storage access instructions can start arriving immediately after the flush instruction).

The method examples described herein may be performed by a cache storage configured to do so, e.g. an implementation of the cache storage 130 described with reference to FIG. 1. For example, any of the methods for controlling a cache storage may be performed by a cache controller, e.g. cache control circuitry, comprised as part of the cache storage. The cache storage may be comprised as part of a data processing system also comprising a processor configured to output storage access instructions, as described with reference to FIG. 1. The data processing system may also comprise main storage coupled to the cache storage.

Figure 3:
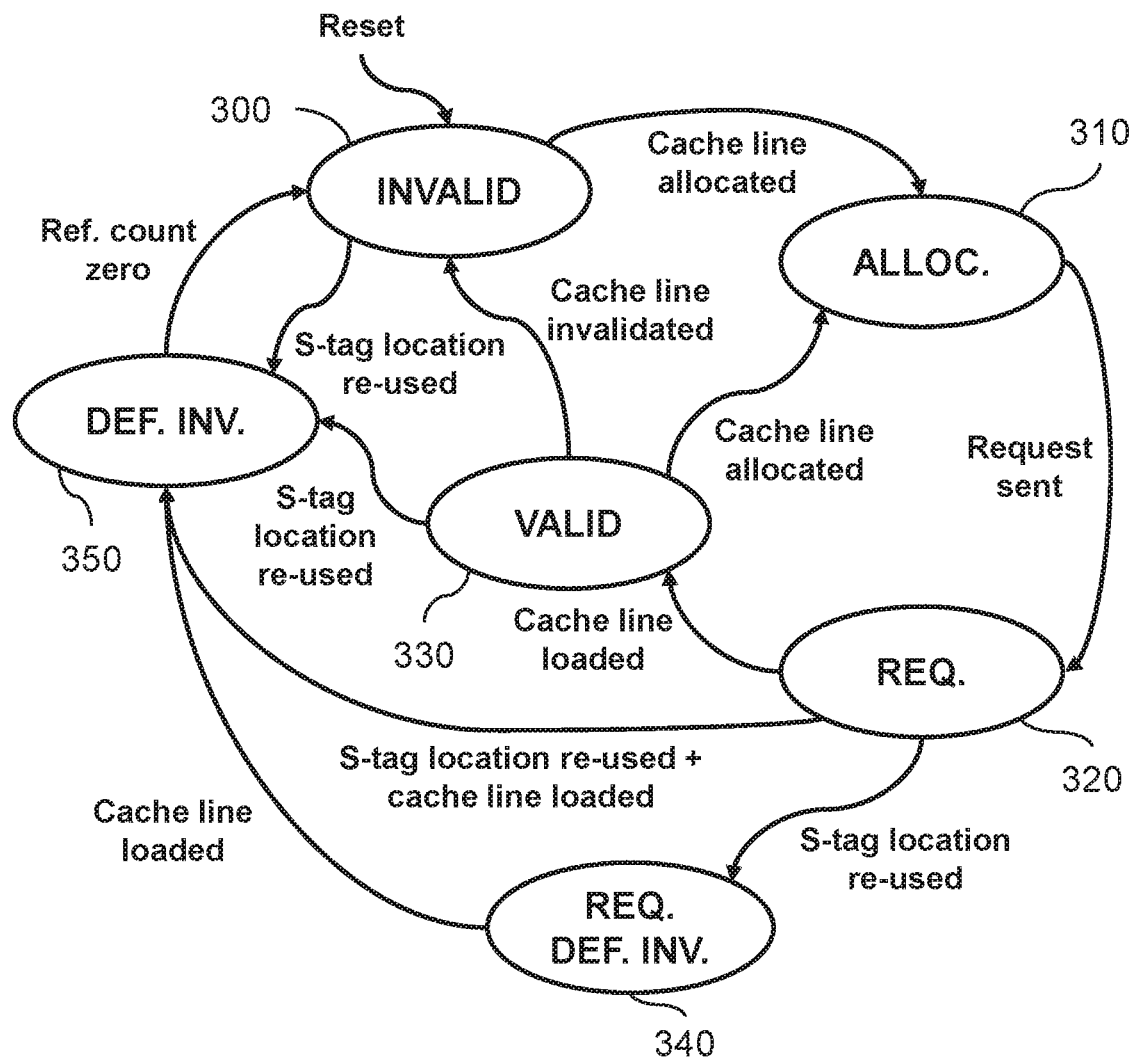
FIG. 3 shows a schematic state-transition diagram for cache lines comprised in cache storage according to examples.

FIG. 3 shows a schematic state-transition diagram (STD) for the cache lines comprised in cache storage according to examples described herein. The STD of FIG. 3 includes the possible cache line statuses for a cache line in cache storage as described above in data processing system 100 and method 200 examples, with reference to FIGS. 1 and 2, respectively. The possible cache line statuses, or states of the cache lines, are connected in the STD of FIG. 3 by arrows showing possible transitions between the states. The arrows (transitions) are labelled by possible events that may cause the corresponding transitions.

The later cache line status, allowing the cache line to be re-used, as described in the method 200 examples above is shown in FIG. 3 as the invalid state 300 of the STD. As described, the invalid state 300 may indicate that a given cache line in this state is empty or clear of stored data, and so is available to store data, e.g. corresponding to a storage location external to the cache storage.

As also described above, a cache line in the invalid state 300 may be allocated, e.g. mapped to a storage location external to the cache storage. The storage location may be a location in data storage, e.g. main storage, external to the cache storage. Thus, a cache line in the invalid state 300 may transition to the allocated state 310 when it has been allocated to a storage location external to the cache storage, as shown in FIG. 3. Such allocation of a cache line may occur when a storage access instruction is received at the cache memory, e.g. by a processor, requesting data that is not stored in the cache storage. A cache miss may occur in this case, for example, and a cache line may be allocated to store the requested data once it has been fetched from data storage, e.g. main memory. When a given cache line is allocated, the individual tag portion associated with the given cache line may be updated to correspond with (at least a part of) a storage identifier, e.g. storage address, representing a storage location in the data storage where the data to be fetched is stored. The pointer to a shareable tag storage location, comprised within the individual tag portion, may be also be updated e.g. to point to a shareable tag storage location comprising a shareable tag portion that corresponds to the storage identifier. The shareable tag portion may be updated to correspond with the storage identifier.

The allocated state 310 may correspond the earlier cache line status, as described, and so according to examples described herein, may prevent a selected shareable tag storage location being re-used. For example, the selected shareable tag storage location may be pointed do by the individual tag portion associated with a given cache line in the allocated state 310.

From the allocated state 310, a cache line may transition to a requested state 320, which may correspond with the (first) intermediate cache line status as described in examples above. This transition may occur after a storage access instruction associated with the cache line has been submitted to the data storage. Therefore, in the requested state 320 a given cache line may be waiting for data to be retrieved from data storage and stored as part of the given cache line. As described, when a given cache line is in the requested state 320 the shareable tag storage location associated with the cache line may be allowed to be re-used, e.g. the shareable tag portion comprised therein may be updated, or the shareable tag storage location may be indicated as available to be re-used (effectively an "invalid" state for the shareable tag storage location).

In examples, when a given cache line is transitioned to the requested state 320, its index (line ID) may be stored in a buffer with an identifier of the associated storage access instruction requesting data from data storage external to the cache storage, as previously described. This buffer may be easily accessible based on the storage access instruction identifier (e.g. request ID) so that the index (line ID) of an associated cache line can be retrieved easily upon receiving a response from the data storage, for example when the requested data is retrieved from the data storage.

When the data associated with the storage access instruction has been retrieved, the associated cache line may be updated from the first intermediate cache line status, i.e. the requested state 320, to the second intermediate cache line status (a valid state 330) once the data has been stored as part of the cache line, and if the shareable tag storage location has not been re-used. Storing the data as part of the cache line may be termed "loading the cache line", thus the STD of FIG. 3 shows the transition from the requested state 320 to the valid state 330 as labelled "cache line loaded".

When a cache line is in the valid state, the data stored as part of the cache line can be retrieved from the cache storage when a storage access instruction sent to the cache storage contains a storage identifier which corresponds with a tag associated with the cache line. A cache line in the valid state 330 may transition back to the invalid state 300, for example if the cache line is invalidated, or evicted, as previously described. Alternatively the cache line may be reallocated and transition directly to the allocated state 310. These possible transitions are shown in the STD of FIG. 3. The valid state 330 may also allow the shareable tag storage location, which the individual tag portion associated with the cache line in the valid state points to, to be re-used.

If the shareable tag storage location associated with a cache line in the requested state 320 has been re-used before the data has been retrieved and stored as part of the cache line, the cache line may be updated to a requested deferred invalid state 340. The requested deferred invalid state 340 may correspond with the (first) given cache line status described in the method 200 examples above. In examples, a given cache line in the requested deferred invalid state 340 may only be used by storage access instructions represented by an identifier in the above-mentioned buffer and associated with the given cache line by the index of the cache line.

A cache line may transition from the requested deferred invalid state 340 to a deferred invalid state 350, which may correspond with the (second) given cache line status described in the method 200 examples above, when the data requested from the data storage is retrieved and stored as part of the cache line, e.g. the cache line is loaded, as shown in the STD of FIG. 3. In the deferred invalid state 350 a cache line may be used by storage access instructions, but only those received before the cache line was in the requested deferred invalid state 340. Storage access instructions received after the first given cache line status was set, e.g. the cache line transitioned to the requested deferred invalid state 340, may be inhibited as described. Thus, a memory barrier may be created, and the cache line in the deferred invalid state 350 may be read by associated storage access instructions received before the memory barrier until the number of instructions dependent on the cache line (its reference counter) reaches zero. At this point, the cache line may transition back to the invalid state 300 to be re-used.

In some examples, a cache line may transition from the requested state 320 directly to the deferred invalid state 350 in a single cycle, as shown in the STD of FIG. 3. For example, if the shareable tag storage location associated with a cache line in the requested state 320 is re-used and the cache line is loaded in the same cycle, the cache line may make this direct transition.

A cache line may transition from the valid state 330 to the deferred invalid state 350 if the shareable tag storage location associated with the cache line (via pointer data comprised in the individual tag portion associated with the cache line) is re-used when the cache line is storing data. In the deferred invalid state 350 a cache line may be used by storage access instructions, but only those received before the cache line transitioned to the deferred invalid state 350. Storage access instructions received after the cache line transitioned to the deferred invalid state 350, may be inhibited as described. Thus, a memory barrier may be created, and the cache line in the deferred invalid state 350 may be read by associated storage access instructions received before the memory barrier until the number of instructions dependent on the cache line (its reference counter) reaches zero. At this point, the cache line may transition back to the invalid state 300 to be re-used, e.g. re-allocated to eventually store new data.

The STD of FIG. 3 also shows a transition between the invalid state 300 and the deferred invalid state 350. This may simplify the state update logic. Practically, any cache line making this transition will transition back to the invalid state 300 e.g. in the following cache cycle (since its reference counter is zero).

The STD of FIG. 3 also shows a reset transition to the invalid state 300. This transition may correspond to a reset instruction to reset, or restart, the system.

The STD of FIG. 3 may be considered a representation of a "state machine", i.e. a system whereby each cache line in cache storage can be in one of a set number of states at a given time, and can transition between states based on events.

In alternative examples, two state machines may be implemented, for example in parallel. A first state machine may include four "main states": invalid, allocated, requested and valid. A second state machine may include two "auxiliary states": normal and deferred invalid. The main states of the first state machine may therefore be represented by a bit string of two bits, the bit string having four possible values corresponding to the four possible states respectively. The auxiliary states may be represented by one bit having two possible values. Thus, the status data of a given cache line, as previously described, may comprise a first portion (e.g. a two-bit string) for signalling a main state of the given cache line, and a second portion (e.g. one bit) for signalling an auxiliary state of the cache line.

Combining the main state and the auxiliary state may give a "combined state" equivalent to a state previously described and shown in the STD of FIG. 3. For example, status data of a cache line representing a combination of the {valid, normal} main and auxiliary states may be equivalent to the valid state 330 previously described and shown in FIG. 3. As another example: the main and auxiliary state combination {valid, deferred invalid} may be equivalent to the deferred invalid state 350 previously described and shown in FIG. 3.

When a shareable tag storage location is re-used, all cache lines associated with individual tag portions that point to the re-used shareable tag storage location may transition from an auxiliary state of normal to deferred invalid. This transition may cause the overall state transitions: requested 320 to requested deferred invalid 340; and valid 330 to deferred invalid 350; previously described and shown in FIG. 3.

Since, in described examples, a given shareable tag storage location may not be re-used if any cache line associated with an individual tag portion that points to the given shareable tag storage location is in the allocated state, the combined state {allocated, deferred invalid} may not be reached. A corresponding overall state is therefore not represented in the STD of FIG. 3.

In this implementation, the transition from the invalid state 300 to the deferred invalid state 350 shown in FIG. 3 may actually correspond to a transition from the combined state {invalid, normal} to {invalid, deferred invalid}. In this way, it may be simple to update the state when re-using a shareable tag storage location. For example, the auxiliary state may be considered to function like a switch that flips from normal to deferred invalid when an associated shareable tag storage location is re-used. This may also describe why the invalid state 300 transitions to the deferred invalid state 350 in the single state machine implementation examples described above and shown in the STD of FIG. 3.

The above embodiments are to be understood as illustrative examples. Further embodiments are envisaged. For example, in addition to data being fetched from data storage, e.g. main storage, the cache storage examples described herein may alternatively or additionally store data directly generated by a processor or one or more other parts of a data processing system, e.g. one or more components of an integrated circuit or "chip".

In examples where the cache storage is positioned between a processor and data storage, e.g. main storage, there may be a cache hierarchy. For example there may be multiple cache levels of the cache storage hierarchically arranged between the processor and the data storage. Additionally or alternatively, the data storage may comprise a storage hierarchy, e.g. based on a cache hierarchy, with multiple storage levels arranged hierarchically.

In examples, storage locations "external to the cache storage" are mentioned. These storage locations may actually be locations in other caches comprised in the cache storage, e.g. in a multi-level or hierarchical cache storage, in certain cases. Thus, storage access instructions may be sent between caches within the cache storage in some examples.

Furthermore, a processor as described herein may comprise any type of circuit or circuitry capable of generating and submitting instructions, e.g. requests, to cache storage.

It should be noted that the Figures are merely schematic, and that, for example, in practice illustrated functional units in the same Figure may share significant hardware circuits, even though they may be shown schematically as separate units. It will also be appreciated that each of the stages, elements and units, etc., of the Figures may be implemented as desired and will accordingly include, for example, appropriate circuitry and/or processing logic, etc., for performing the associated operation and functions.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure.

What is claimed is:

1. A method of controlling cache storage comprising cache lines configured to store data entries representing data which are retrievable from the cache storage when a storage access instruction contains a storage identifier which corresponds with a tag associated with a cache line, wherein said tag associated with said cache line comprises an individual tag portion associated with a single cache line, and a shareable tag portion which is associated with a plurality of cache lines, said individual tag portion comprising a pointer to a shareable tag storage location comprising the shareable tag portion, the method comprising:

allowing re-use of a selected shareable tag storage location and thus updating a first shareable tag portion comprised therein to a second shareable tag portion;

identifying one or more cache lines associated with individual tag portions comprising a pointer to the selected shareable tag storage location;

setting a given cache line status for each of the identified cache lines, wherein the given cache line status:

a) allows a cache line to continue to be used in relation to a storage access instruction received before said given cache line status was set; and b) inhibits the cache line from being used in relation to a storage access instruction received after the given cache line status is set; and setting a first intermediate cache line status for a cache line before setting said given status and after sending the storage access instruction to data storage to retrieve data for storing as part of said cache line, wherein the first intermediate cache line status allows said selected shareable tag storage location to be re-used, wherein the method comprises setting a second intermediate cache line status for said cache line after storing data in the cache storage as part of said cache line based on said storage access instruction to said data storage, and wherein the second intermediate cache line status allows said selected shareable tag storage location to be re-used.

2. The method according to claim 1, comprising setting an earlier cache line status before setting said given cache line status, wherein the earlier cache line status prevents said selected shareable tag storage location being re-used.

3. The method according to claim 2, comprising setting said earlier cache line status for a cache line before sending a storage access instruction to data storage to retrieve data for storing as part of said cache line.

4. The method according to claim 1, wherein said given cache line status comprises one of a first given cache line status and a second given cache line status, the method comprising:

setting said first given cache line status for each of the identified cache lines for which a corresponding storage access instruction has been sent to data storage to retrieve respective data for storing as part of each respective cache line; and setting said second given cache line status for each of the identified cache lines for which respective data is stored in the cache storage as part of each respective cache line.

5. The method according to claim 1, comprising setting a later cache line status after said given cache line status, wherein the later cache line status allows the cache line to be re-used.

6. The method according to claim 5, comprising:

determining a respective number of instructions dependent on each of the identified cache lines having said given cache line status; and setting said later cache line status for each of the identified cache lines for which the respective number of dependent instructions is zero.

7. The method according to claim 1, comprising, when allowing a cache line to continue to be used in relation to the storage access instruction which was received before said given cache line status was set, and before said selected shareable tag storage location is re-used:

locking said cache line;

obtaining an index of the cache line in the cache storage; and storing the index and an identifier of the storage access instruction as an entry in a buffer.

8. The method according to claim 7, comprising:

relaying the storage access instruction to data storage to retrieve data for storing as part of the cache line in the cache storage;

receiving said data at the cache storage;

identifying the entry in the buffer corresponding to the identifier of the storage access instruction;

obtaining the index of the cache line in the cache storage from the entry in the buffer;

accessing the cache line in the cache storage based on said index; and storing said data as part of the cache line.

9. The method according to claim 1 comprising, before re-using the selected shareable tag storage location:

receiving a request for data not stored in the cache storage;

allocating a cache line to store said data in the cache storage;

sending a storage access instruction to data storage to retrieve the data for storing as part of said cache line; and associating an identifier of the storage access instruction with an index of the said cache line in the cache storage.

10. The method according to claim 9 comprising, after the data associated with the storage access instruction submitted to the data storage is received at the cache storage:
obtaining the index of said cache line based on the identifier of the storage access instruction; and
storing a data entry representing the data as part of the said cache line in the cache storage.

11. The method according to claim 1, comprising:
receiving a storage access instruction corresponding to data represented by a data entry stored in one of the identified cache lines; and
signaling a cache miss based on said cache line having the given cache line status.

12. The method according to claim 1, comprising, for each cache line of the cache storage, storing in a data structure:
a first data value representing whether or not a respective cache line is associated with the selected shareable tag storage location; and
a second data value representing whether or not the respective cache line is associated with a pending storage access instruction.

13. The method according to claim 1, comprising determining a number of cache lines of the cache storage that are associated with the selected shareable tag storage location.

14. The method according to claim 1, comprising:
receiving a flush instruction to clear the data stored in the cache storage;
setting the given cache line status for each cache line of the cache storage;
determining a number of instructions dependent on each cache line; and
in response to determining that the number of instructions dependent on each cache line is zero for a subset of cache lines in the cache storage, clearing data being stored as part of each cache line in the subset of cache lines.

15. Cache storage comprising cache lines to store data entries representing data which are retrievable from the cache storage when a storage access instruction contains a storage identifier which corresponds with a tag associated with a cache line,
wherein said tag associated with said cache line comprises an individual tag portion associated with a single cache line, and a shareable tag portion which is associated with a plurality of cache lines, said individual tag portion comprising a pointer to a shareable tag storage location comprising the shareable tag portion,
the cache storage configured to:
allow re-use of a selected shareable tag storage location and thus update a first shareable tag portion comprised therein to a second shareable tag portion;
identify one or more cache lines associated with individual tag portions comprising a pointer to the selected shareable tag storage location;
set a given cache line status for each of the identified cache lines, wherein the given cache line status:
a) allows a cache line to continue to be used in relation to a storage access instruction received before said given cache line status was set; and
b) inhibits the cache line from being used in relation to a storage access instruction received after the given cache line status is set; and
set a first intermediate cache line status for a cache line before setting said given status and after sending the storage access instruction to data storage to retrieve data for storing as part of said cache line,
wherein the first intermediate cache line status allows said selected shareable tag storage location to be re-used,
set a second intermediate cache line status for said cache line after storing data in the cache storage as part of said cache line based on said storage access instruction to said data storage, and
wherein the second intermediate cache line status allows said selected shareable tag storage location to be re-used.

16. A data processing system comprising:
a processor configured to output storage access instructions; and
cache storage comprising cache lines to store data entries representing data which are retrievable from the cache storage when a storage access instruction contains a storage identifier which corresponds with a tag associated with a cache line,
wherein said tag associated with said cache line comprises an individual tag portion associated with a single cache line, and a shareable tag portion which is associated with a plurality of cache lines, said individual tag portion comprising a pointer to a shareable tag storage location comprising the shareable tag portion,
the cache storage comprising cache control circuitry configured to:
allow re-use of a selected shareable tag storage location and thus update a first shareable tag portion comprised therein to a second shareable tag portion;
identify one or more cache lines associated with individual tag portions comprising a pointer to the selected shareable tag storage location;
set a given cache line status for each of the identified cache lines, wherein the given cache line status:
a) allows a cache line to continue to be used in relation to a storage access instruction received before said given cache line status was set; and
b) inhibits the cache line from being used in relation to a storage access instruction received after the given cache line status is set; and
set a first intermediate cache line status for a cache line before setting said given status and after sending the storage access instruction to data storage to retrieve data for storing as part of said cache line,
wherein the first intermediate cache line status allows said selected shareable tag storage location to be re-used,
set a second intermediate cache line status for said cache line after storing data in the cache storage as part of said cache line based on said storage access instruction to said data storage, and
wherein the second intermediate cache line status allows said selected shareable tag storage location to be re-used.

* * * * *